United States Patent
Röhner et al.

(10) Patent No.: US 6,780,473 B1
(45) Date of Patent: Aug. 24, 2004

(54) MULTILAYER PLASTIC COMPOSITES AND A METHOD FOR THE PRODUCTION THEREOF

(75) Inventors: Jürgen Röhner, Köln (DE); Klaus Zander, Mülheim (DE); Rüdiger Gorny, Krefeld (DE); Marco Roelofs, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 260 days.

(21) Appl. No.: 10/088,147
(22) PCT Filed: Aug. 18, 2000
(86) PCT No.: PCT/EP00/08070
§ 371 (c)(1),
(2), (4) Date: Feb. 25, 2002
(87) PCT Pub. No.: WO01/15895
PCT Pub. Date: Mar. 8, 2001

(30) Foreign Application Priority Data

Aug. 30, 1999 (DE) .......................... 199 41 214

(51) Int. Cl.⁷ ................................. B05D 1/38
(52) U.S. Cl. .................................. 427/407.1
(58) Field of Search ................ 427/407.1, 74, 427/77; 428/412, 421, 422, 480, 483, 500, 522; 156/311; 264/173.11, 173.16

(56) References Cited

U.S. PATENT DOCUMENTS

| | | | |
|---|---|---|---|
| 4,419,531 A | * 12/1983 | Lang et al. | ................. 136/251 |
| 4,659,625 A | 4/1987 | Decroly et al. | ............. 428/412 |

FOREIGN PATENT DOCUMENTS

| | | | | |
|---|---|---|---|---|
| DE | 19 814 653 | 10/1999 | | |
| EP | 0 629 004 | 12/1994 | | |
| EP | 0 629 004 A1 | * 12/1994 | ......... H01L/31/048 | |

OTHER PUBLICATIONS

Entry for "polycarbonate" from Hawley's Condensed Chemical Dictionary, 12$^{th}$ ED, © 1993 by Van Nostrand Reinhold, p. 931.*

* cited by examiner

*Primary Examiner*—Shive P. Beck
*Assistant Examiner*—William Phillip Fletcher, III
(74) *Attorney, Agent, or Firm*—Joseph C. Gil; Aron Preis

(57) ABSTRACT

A process for the preparation of a plastic composite is disclosed. The composite contains a first fluoropolymer layer, a second, middle layer of polycarbonate and a third layer of ethylene-vinyl acetate copolymer. The process entails preparing a plastics composite of fluoropolymer and polycarbonate layers and applying the layer of ethylene-vinyl acetate copolymer to the polycarbonate layer.

3 Claims, 1 Drawing Sheet

MULTILAYER PLASTIC COMPOSITES AND A METHOD FOR THE PRODUCTION THEREOF

Figure 1:
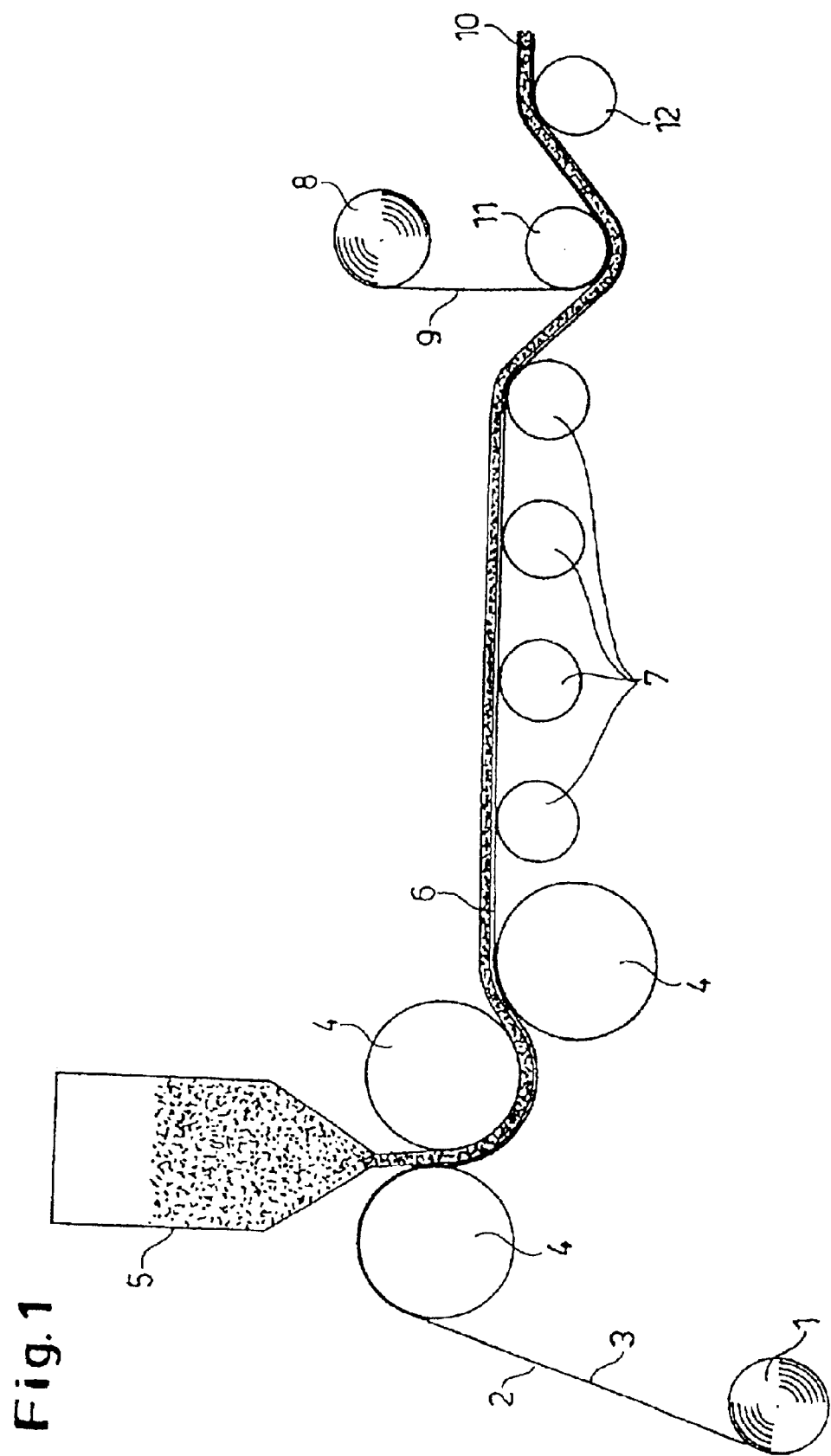

The present invention relates to a process for the preparation of multi-layer plastics composites.

Fluoropolymers have a plurality of advantageous properties. They are resistant to most chemicals. They are resistant to environmental influences such as, e.g., weathering and UV radiation. Fluoropolymers are therefore used for numerous purposes, specially as a protective layer against the action of chemicals or as a UV-resistant protective layer against environmental influences of other kinds. Fluoropolymers have the disadvantage, however, of being very expensive. Moreover, their mechanical properties, e.g., impact resistance, do not meet the requirements of all applications. Consequently, fluoropolymers are used in some cases as a layer in multi-layer plastics composites. The other layers contribute further advantageous properties, such as, for example, good mechanical properties or low costs or functional properties such as, for example, ease of melting-on, as a result of which the plastics composite may be further processed to laminates.

U.S. Pat. No. 4,659,625 discloses plastics composites of three layers, the first layer comprising polyvinyl fluoride or polyvinylidene fluoride, the second, middle layer comprising a vinyl acetate polymer, for example, an ethylene-vinyl acetate copolymer, and the third layer comprising a polar polymer, for example, polycarbonate. The middle layer of vinyl acetate polymer is used, according to the teaching of U.S. Pat. No. 4,659,625, as a coupling agent to bond the two outer layers. Accordingly, the method of preparation given in U.S. Pat. No. 4,659,625 is that of bonding the solid layers of polyvinyl fluoride or polyvinylidene fluoride and the polar polymer by means of vinyl acetate polymer. According to the teaching of U.S. Pat. No. 4,659,625, bonding takes place either at room temperature, in which case the vinyl acetate polymer is used as a solution, or by heating to above the softening point of the vinyl acetate polymer, in which case the outer layers remain solid. Moreover, the coextrusion of the three polymer layers is mentioned in U.S. Pat. No. 4,659,625 as a possible method of preparation. It is expressly pointed out in U.S. Pat. No. 4,659,625 that the method of preparation must be selected in accordance with the special properties of the polymers used for the three layers.

Coextrusion is a particularly advantageous process for the preparation of multi-layer plastics composites. In coextrusion, the layers of the composite are brought together in a coextrusion block as melt layers and then extruded together through a die. In order to produce sheets or films, a slot die, for example, is used during extrusion.

The preparation of plastics composites of several layers, wherein one layer comprises an ethylene-vinyl acetate copolymer and one layer comprises polycarbonate is not possible by coextrusion because sufficiently low-viscosity polycarbonate melts have such a high temperature, typically 280° C. to 320° C., that the properties of the ethylene-vinyl acetate copolymers are impaired, e.g., due to crosslinking. A deterioration in the optical properties such as, e.g., discolouration and a deterioration in the mechanical properties such as, e.g., strength and elasticity occurs. Such a deterioration is undesirable in terms of the use of the plastics composites, particularly, e.g., in the use in photovoltaic modules.

Plastics composites of three layers, wherein the first layer comprises a fluoropolymer (particularly polyvinyl fluoride, hereinafter abbreviated to PVF), the second, middle layer comprises polycarbonate (hereinafter abbreviated to PC) and the third layer comprises ethylene-vinyl acetate copolymer (hereinafter abbreviated to EVA) are required, for example, for the manufacture of photovoltaic modules. Their preparation by coextrusion is not, however, possible for the intended application mentioned, for the reasons already given.

Fluoropolymers and polycarbonate adhere very poorly to one another. For this reason, a coupling agent is normally used between the layer of fluoropolymer and the layer of polycarbonate.

The object of the present invention is, therefore, to provide a process for the preparation of plastics composites of three layers wherein the first layer comprises a fluoropolymer, the second, middle layer comprises polycarbonate, and the third layer comprises ethylene-vinyl acetate copolymer, which does not have the disadvantages of the prior art.

The object according to the invention is achieved by a process for the preparation of plastics composites of three layers, wherein the first layer comprises a fluoropolymer, the second, middle layer comprises polycarbonate and the third layer comprises ethylene-vinyl acetate copolymer, characterised by the following steps to be executed one after the other:

a) Preparation of a plastics composite of two layers, wherein the first layer comprises the fluoropolymer and the second layer comprises the polycarbonate, b) Application of the third layer of ethylene-vinyl acetate copolymer to the polycarbonate layer of the plastics composite of two layers.

The present invention thus provides the process mentioned.

The process according to the invention has numerous advantages. The required plastics composites of three layers, wherein the first layer comprises a fluoropolymer, the second, middle layer comprises polycarbonate and the third layer comprises ethylene-vinyl acetate copolymer, can be prepared according to the process of the invention in a simple and inexpensive manner without the ethylene-vinyl acetate copolymer being damaged by heat, e.g., due to crosslinking.

The process is solvent-free and therefore advantageous from an economic and ecological standpoint. The process according to the invention permits the continuous preparation of endless plastics composites and, e.g., during a later manufacture of photovoltaic modules, obviates the separate insertion and polishing of the individual layers in each case (films or sheets).

The plastics composites according to the invention have good mechanical properties such as, e.g., high strength, high toughness and high elasticity. They have good optical properties such as, e.g., high transparency and high gloss and low production-related discolouration. They have good resistance to chemicals and environmental influences such as weathering and UV radiation. This is particularly the case when at least one of the three layers has been provided with further additives, such as, e.g., UV stabilisers, absorbers, heat stabilisers, colorants, catalysts, hydrolysis stabilisers, mineral substances, nanoparticles etc. The fluoropolymer layer (optionally also the PC layer) is preferably provided with a sufficient amount of an adequate UV absorber. Moreover, the PC layer is preferably protected by coextrusion, coating or laminating with a UV absorber-containing material (for example, 2 to 20 wt. % of UV absorber), whether or not the PVF layer contains UV absorber. The layers of the plastics composite adhere well to one another.

The process steps a) and b) of the process according to the invention may be carried out one immediately after the other or with an interval of time between them and/or at a distance from one another, e.g., in order to store the two-layer plastics composite on an interim basis. It is preferable to carry out said steps one immediately after the other. In this case, a heating or cooling of the two-layer plastics composite may take place between process steps a) and b).

A preferred embodiment of the process according to the invention is that in which a coupling agent layer is applied to the polycarbonate layer on the two-layer plastics composite which is prepared in process step a), prior to the application of the third layer in process step b).

Suitable coupling agents are, for example, those based on acrylate.

A further preferred embodiment of the process according to the invention is that in which the two-layer plastics composite in process step b) has a temperature at which the ethylene-vinyl acetate copolymer does not undergo thermal damage and at which the layer of ethylene-vinyl acetate copolymer is applied as a film to the two-layer plastics composite.

In this case, the two-layer plastics composite in process step b) preferably has a temperature from 20° C. to 120° C., particularly preferably a temperature from 50°C. to 90° C. The EVA film is added preferably at a temperature from 10° C. to 60° C., particularly preferably 20° C. to 40° C.

A further preferred embodiment of the process according to the invention is that in which the two-layer plastics composite in process step b) has a temperature at which the ethylene-vinyl acetate copolymer does not undergo any thermal damage, e.g., due to crosslinking, and at which the layer of ethylene-vinyl acetate copolymer is applied as a melt to the two-layer plastics composite.

In this case, the two-layer plastics composite in process step b) preferably has a temperature from 20° C. to 120° C., particularly preferably 50° C. to 90° C. The EVA melt preferably has a temperature from 80° C. to 150° C., particularly preferably from 90° C. to 130° C. and is applied to the two-layer plastics composite preferably after extrusion through a slot die.

A further preferred embodiment of the process according to the invention is that in which the two-layer plastics composite in process step a) is applied by extrusion of a polycarbonate melt to the polycarbonate layer of a plastics composite of polycarbonate and fluoropolymer. In this case, the layer of polycarbonate originally present and the additionally applied layer of polycarbonate combine to form a single polycarbonate layer, so that a plastics composite of two layers, a fluoropolymer layer and a polycarbonate layer, is obtained. The plastics composite of polycarbonate and fluoropolymer used, onto which the polycarbonate melt is applied, may contain a coupling agent layer between the fluoropolymer layer and the polycarbonate layer. Suitable coupling agents in this case are, for example, acrylate polymers.

A further preferred embodiment of the process according to the invention is that in which the two-layer plastics composite in process step a) is applied by extrusion of a polycarbonate melt to a solid fluoropolymer layer. A coupling agent layer may be used between the layer of polycarbonate and the layer of fluoropolymer.

A further preferred embodiment of the process according to the invention is that in which the two-layer plastics composite in process step a) is prepared by bonding a layer of polycarbonate and a layer of fluoropolymer.

A particularly preferred embodiment of the process according to the invention is that in which the plastics composite from step a) has a temperature in process step b) at which the ethylene-vinyl acetate copolymer does not undergo any appreciable thermal damage and at which the layer of ethylene-vinyl acetate copolymer is applied as a melt to the two-layer plastics composite. In this case, the process steps a) and b) are carried out preferably one immediately after the other, temperature control of the two-layer plastics composite taking place by cooling on a transport section.

Ethylene-vinyl acetate copolymers within the meaning of the present invention are copolymers of vinyl acetate and ethylene, which preferably have a vinyl acetate content of at least 30 wt. %. Particularly preferably, they have a vinyl acetate content from 50 to 90 wt %. Such ethylene-vinyl acetate copolymers are well known and are sold as commercial products. For example, ethylene-vinyl acetate film, Elvax 485 type from BP Chemicals, D-89165 Dietenheim, Germany. They may be prepared by known methods.

Polycarbonates within the meaning of the present invention are those based on diphenols corresponding to the formula (II)

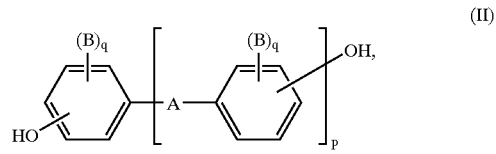

(II)

wherein
A means a single bond $C_1$–$C_5$-alkylene, $C_2$–$C_5$-alkylidene, $C_5$–$C_6$-cycloalkylidene, S or $SO_2$,
B means chlorine, bromine, $CH_3$,
q means 0, 1 or 2, and
p is 1 or 0,
or alkyl-substituted dihydroxyphenyl cycloalkanes corresponding to the formula (III)

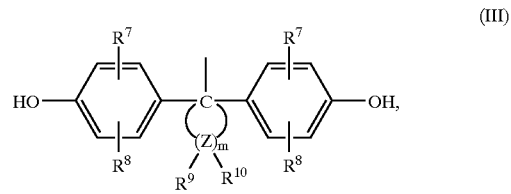

(III)

wherein
$R^7$ and $R^8$ independently of one another, mean in each case hydrogen, halogen, preferably chlorine or bromine, $C_1$–$C_8$-alkyl, $C_5$–$C_6$-cycloalkyl, $C_6$–$C_{10}$-aryl, preferably phenyl, and $C_7$–$C_{12}$-aralkyl, preferably phenyl-$C_1$–$C_4$-alkyl, particularly benzyl,
m means an integer of 4, 5, 6 or 7, preferably 4 or 5,
$R^9$ and $R^{10}$ which may be selected individually for each Z, independently of one another mean hydrogen or $C_1$–$C_6$-alkyl,
and
Z means carbon, provided that on at least one atom Z $R^9$ and $R^{10}$ simultaneously mean alkyl.

Suitable diphenols corresponding to the formula (II) are, e.g., hydroquinone, resorcinol, 4,4'-dihydroxydiphenyl, 2,2-bis-(4-hydroxyphenyl) propane (i.e. bisphenol A), 2,4-bis-(4-hydroxyphenyl)-2-methylbutane, 1,1-bis4-hydroxyphenyl)cyclohexane, 2,2-bis-(3-chloro-4-hydroxyphenyl)propane, 2,2-bis(3,5-dibromo-4-hydroxyphenyl)propane.

Preferred diphenots corresponding to the formula (II) are 2,2-bis-(4-hydroxyphenyl)propane, 2,2-bis-(3,5-dichloro-4-hydroxyphenyl)propane and 1,1-bis-(4-hydroxyphenyl)cyclohexane.

Preferred diphenols corresponding to the formula (III) are 1,1-bis-(4-hydroxyphenyl)-3,3-dimethylcyclohexane, 1,1-bis-(4-hydroxyphenyl)-3,3,5-trimethylcyclohexane and 1,1-bis-(4-hydroxyphenyl)-2,4,4-trimethylcyclopentane.

Polycarbonates suitable according to the invention are both homopolycarbonates and copolycarbonates. A mixture of the thermoplastic polycarbonates defined above is also suitable.

Polycarbonates may be prepared in a known way from diphenols with phosgene by the phase boundary process or with phosgene by the process in the homogenous phase, the so-called pyridine process, or by the melt transesterification process from diphenols and carbonic acid esters, wherein the molecular weight may be adjusted in a known way by an appropriate amount of known chain terminators. Said methods of preparation are described, e.g., in H. Schnell "Chemistry and Physics of Polycarbonates", Polymer Reviews, Volume 9, p. 31–76 Interscience Publishers, 1964.

Suitable chain terminators are, e.g., phenol, cumylphenol, p-chlorophenol, p-tert-butylphenol or 2,4,6-tribromophenol, or long-chain alkylphenols, such as 4-(1,1,3,3-tetramethylbutyl)phenol or monoalkylphenol, or dialkylphenol with a total of 8 to 20 carbon atoms in the alkyl substituents such as, e.g., 3,5-di-tert-butylphenol, p-iso-octylphenol, p-tert-octylphenol, p-dodecylphenol and 2-(3,5-dimethylheptyl)phenol and 4(3,5-dimethylheptyl)phenol.

The amount of chain terminators is generally from 0.5 to 10 mole %, based on the sum of the diphenols used in each case corresponding to the formula (II) and/or (III).

The polycarbonates suitable according to the invention have average molecular weights ($\overline{M}_w$, weight-average, measured, e.g., by ultracentrifugation or scattered light measurement) from 10,000 to 200,000 g/mole, preferably 18,000 to 80,000 g/mole, particularly preferably 19,000 to 38,000 g/mole. 1,1,1-tris(4hydroxyphenyl)ethane and bis-(3-methyl4hydroxyphenyl)-2-oxo-2,3-dihydroindole is preferred.

The polycarbonates suitable according to the invention may be branched in a known manner, and preferably by the incorporation of 0.05 to 2 mole %, based on the sum of diphenols used, of compounds with three or more than three functional groups, e.g., those with three or more than three phenolic groups.

Preferred polycarbonates apart from the bisphenol-A homopolycarbonate, are the copolycarbonates of bisphenol A with up to 15 mole %, based on the mole sums of diphenols, of 2,2-bis-(3,5-dibromo-4-hydroxyphenyl)propane and the copolycarbonates of bisphenol A with up to 60 mole %, based on the mole sums of diphenols, of 1,1-bis-(4-hydroxyphenyl)-3,3,5-trimethylcyclohexane.

The polycarbonates may be replaced partially or wholly by aromatic polyester carbonates. The aromatic polycarbonates may also contain polysiloxane blocks. The preparation thereof is described, for example, in U.S. Pat. No. 3,821,325.

The fluoropolymers used are polymers in which the hydrogen atoms of the carbon chain of polyethylene are replaced wholly or partially by fluorine atoms, and chlorine or fluorine-chlorine derivatives thereof and derived copolymers.

The fluoropolymers used in preference are polyvinyl fluoride or polyvinylidene fluoride. Polyvinyl fluoride is particularly preferred.

A plastics composite within the meaning of the present invention is, in particular, a plastics sheet or a plastics film.

The thickness of the sheet or film is preferably 300 μm to 12 mm, particularly preferably 500 μm to 5 mm. The thickness of the fluoropolymer layer is preferably 10 μm to 500 μm, particularly preferably 20 μm to 200 μm. The thickness of the polycarbonate layer is preferably 100 μm to 12 μm, particularly preferably 200 μm to 5 mm. The thickness of the ethylene-vinyl acetate copolymer layer is preferably 100 μm to 1 mm, particularly preferably 300 μm to 800 μm.

The plastics composites according to the invention may be used, for example, for the manufacture of photovoltaic modules. For example, solar cells based on silicon may be embedded between two plastics composites with the three-layer composition fluoropolymer-polycarbonate-ethylene-vinyl acetate copolymer in such a way that the sequence of layers is fluoropolymer-polycarbonate-ethylene-vinyl acetate copolymer-solar cells-ethylene-vinyl acetate copolymer-polycarbonate-fluoropolymer. In a subsequent process, e.g., the hot laminating process, this arrangement is heated to such an extent that the EVA softens so that the two EVA layers combine with the inclusion of the solar cells.

The plastics composites according to the invention may be used for numerous other purposes. For example, due to the good resistance to chemicals of the fluoropolymer layer and due to their good resistance to weathering and UV resistance, they may be used, optionally after being laminated onto support materials by means of the ethylene-vinyl acetate copolymer layer, as a material in the chemical industry, the food industry or the pharmaceutical industry.

The process according to the invention is explained in more detail below on the basis of a drawing (FIG. 1) representing only one preferred embodiment.

The preparation of a plastics composite of three layers according to the invention is shown in FIG. 1. A two-layer film 1 of a polycarbonate layer 2 and a polyvinyl fluoride layer 3 is guided over a three-roll polishing stack 4. A melt film of polycarbonate is fed between the first and the second roll of the polishing stack through a slot die 5 which is fed with a polycarbonate melt by means of an extruder. Said melt film combines with the polycarbonate layer 2 so that a thicker, still hot polycarbonate layer and hence in turn a two-layer film 6 is obtained. This is cooled by transport on a roller conveyor 7 to the required temperature at which the film of ethylene-vinyl acetate copolymer 9 is no longer damaged by heat but still softens sufficiently to bring about good adhesion. A film of ethylene-vinyl acetate copolymer 9 is then applied to the polycarbonate layer. The plastics composite of three layers 10 according to the invention obtained in this way is hauled off over two further rollers 11 and 12 and may then be wound, optionally after cooling, or further processed in another way.

The invention will be explained subsequently in more detail on the basis of examples.

With an arrangement as shown in FIG. 1, an EVA film was applied during PC sheet extrusion to the upper side of the sheet, and a PVF-PC film to the lower side of the sheet.

The PC sheet was prepared by extrusion through a slot die with a width of 800 mm and a die lip gap of 5 mm. The PC sheet had a thickness of 3 mm and a width of 780 mm.

The polycarbonate used was Makrolon® 3103 from Bayer AG, Leverkusen, Germany. This is a homopolycarbonate based on bisphenol A.

The processing parameters typical for Makrolon® 3103 sheet extrusion were set:
Temperature Settings on the Extruder:
Extruder zone Z1 290° C.
Extruder zone Z2 290° C.
Extruder zone Z3 280° C.

Extruder zone Z4 260° C.
Extruder zone Z5 265° C.
Extruder zone Z6 290° C.
Die 280° C.
Mass temperature 300° C.
Nature of the Film:
1. Ethylene-vinyl acetate copolymer (EVA): Elvax® 485.00, BP Chemicals D-89165 Dietenheim, Germany
   Film thickness: 500 μm
   Film width: 660 mm
2. Two-layer film 1 (Makrofol® EPC, (PVC-PC film), Bayer)
   Film thickness 550 μm (375 μm bisphenol A homopolycarbonate, 25 μm PVF)

The EVA film was not dried beforehand, the Makrofol EPC film was pre-dried at 80° C. in the circulating air drier.

Roll temperatures of the three-roll polishing stack:
Roll 1: 120° C.
Roll 2: 127° C.
Roll 3: 143° C. Haul-off speed: 0.98 m/min Sheet Samples Prepared:
1. PVF-PC sheet
2. PVF-PC-EVA sheet Test Procedure:

The PVF-PC film was fed from below over the 1st roll to the 1st nip. The PC side of the film (smooth side of the film) was in contact with the PC melt. The bead remained on roll 2 (contrary to the experience with material laminating). The film was fed via the traverse, the film being kept somewhat under tension. The unwinding speed was established by the sheet haul-off speed.

The EVA film was fed from above over a chromium roller (11), the sheet being passed through beneath the roller (film feed from above, pressure applied by the roller). The sheet temperature at this location was 76° C. In this position, the film started to melt easily and could not be separated again by hand. The unwinding speed was established by the sheet haul-off speed.

In order to prevent the EVA film sticking to the chromium rollers of the roller conveyor, a protective film of PE was fed between EVA film and chromium roller, which acted simultaneously as a protective film for the composite. The PE film could be removed later from the laminated sheet without difficulty.

What is claimed is:

1. A process for the preparation of plastics composites of three layers, wherein the first layer comprises polyvinyl fluoride, the second, middle layer comprises polycarbonate based on bisphenol A and the third layer comprises ethylene-vinyl acetate copolymer, characterised by the following steps to be executed one after the other:

a) preparation of a plastics composite of two layers, wherein the first layer comprises the polyvinyl fluoride and the second layer comprises the polycarbonate, b) application of the third layer of ethylene-vinyl acetate copolymer to the polycarbonate layer of the plastics composite of two layers.

2. A process according to claim 1, characterised in that the plastics composite of two layers in the process step b) has a temperature at which the ethylene-vinyl acetate copolymer does not undergo thermal damage, and in that the layer of ethylene-vinyl acetate copolymer is applied as a film to the plastics composite of two layers.

3. A process according to claim 2, characterised in that the plastics composite of two layers in process step b) has a temperature from 20° C. to 120° C.

* * * * *